Description: UNITED STATES PATENT OFFICE.

ALFRED JOHNSON, OF WESEL, GERMANY.

MANUFACTURE OF LAVATORY-BASINS, &c., MADE OF EARTHENWARE.

No. 839,150.　　　　Specification of Letters Patent.　　　　Patented Dec. 25, 1906.

Application filed October 16, 1905. Serial No. 283,064.

*To all whom it may concern:*

Be it known that I, ALFRED JOHNSON, a subject of the King of Great Britain and Ireland, and a resident of the town of Wesel, Germany, have invented new and useful Improvements in or Relating to the Manufacture of Lavatory-Basins and the Like Made of Earthenware, of which the following is a specification.

This invention relates chiefly to the manufacture of sanitary and like goods made of earthenware, and particularly lavatory-bowls and closet-basins.

At present goods of this kind are formed by hand on a single plaster mold, the potter building up the ware out of plastic clay, which is laid on the mold until the desired thickness and shape of ware is attained.

The object of this invention is to effect the formation of the ware by a process of casting, and thus permit of the employment of unskilled labor, as well as cheapen and improve the manufacture.

According to the invention I use the ordinary mixture of clay, flint, and stone, &c.; but instead of using it in a plastic state I use it in a liquid or fluid state, and for that purpose add to it a solution of soda, (sodium carbonate,) water-glass, and water. I also use two molds where necessary, one for the interior and the other for the exterior of the object to be cast, and leave a space betwen the molds corresponding to the form and thickness of the intended object.

When using two molds at one or more points I provide them with air-vents, and one of such molds I also provide with a "gate" or inlet. Through such inlet I introduce the liquid clay until the space between the molds is full. I then allow the clay to stand until it sets hard, after which the molds are removed and the ware prepared for the usual firing, glazing, or other and subsequent operations in the usual way.

The following proportions of the soda, water-glass, and water to the clay have been found to serve, viz: two tons of clay, five and three-fourths pounds of soda, five and one-half pounds of water-glass, forty-four gallons of water. These proportions may vary with the character of the clay, but those given have been found to work well when the clay is made of a mixture of ball-clay, china-clay, flint, (or quartz,) stone, (or feldspar.)

The clay is by preference passed through the usual sieves and pressed before the solution is added. After leaving the presses it is placed in a vessel and the solution then added to and mixed with it.

While chiefly for sanitary ware, the invention may be adapted for use in the casting of other articles of earthenware, the molds being made to suit.

The special feature of the invention is the use of the soda and water-glass in combination, the soda causing the clay mixture to become fluid and the water-glass causing the mixture after being cast to set hard, no matter how thin or thick the section of the ware. By adding more soda the clay becomes more fluid, and by adding more water-glass the clay sets quicker. The proportions before named give the best results for the mixture of clay described.

What I claim is—

1. Soda (sodium carbonate) and water-glass in combination with clay as used for making sanitary earthenware, the soda, water-glass and clay being in or about the proportions indicated for the purposes set forth.

2. Soda (sodium carbonate) and water-glass in combination for use in enabling clay to be cast in molds as set forth.

In witness whereof I have hereunto set my hand in the presence of two witnesses.

ALFRED JOHNSON.

Witnesses:
　AUGUST FINKS,
　HEINRICH HEILIGENPRAHL.